J. H. NICHOLS.
DRAIN TRAP.
APPLICATION FILED JUNE 2, 1913.
1,211,336.
Patented Jan. 2, 1917.
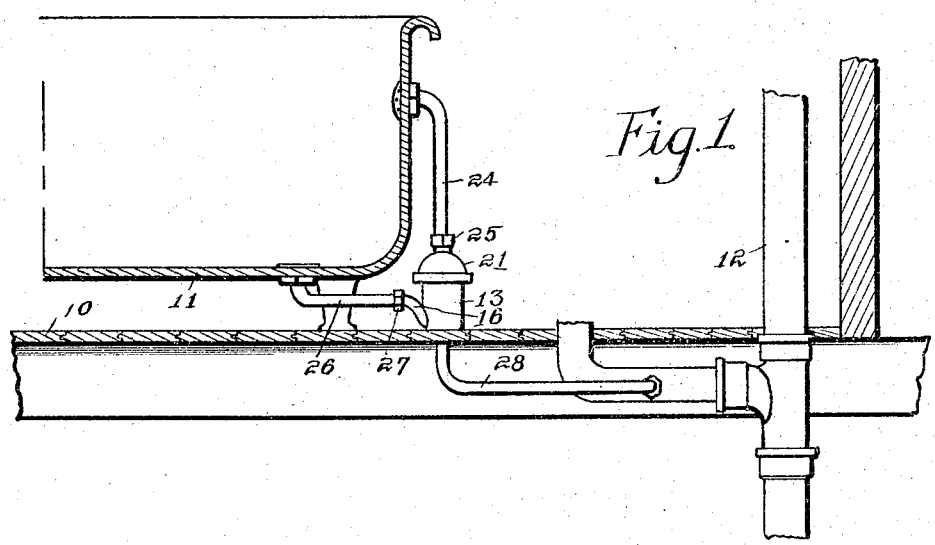
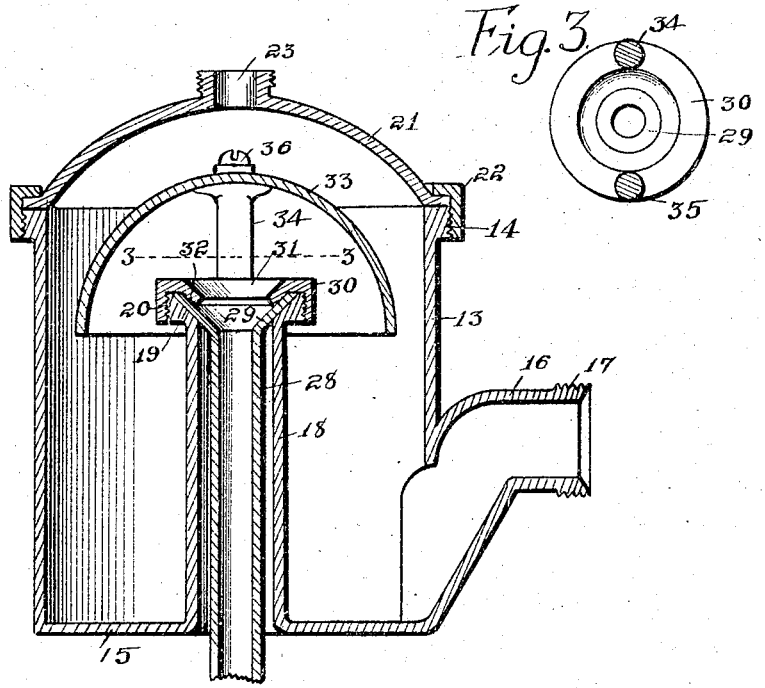
Witnesses
A. G. Hague
L. A. Paley
Inventor
John H. Nichols
by Orwig & Bair attys

UNITED STATES PATENT OFFICE.

JOHN H. NICHOLS, OF SPENCER, IOWA.

DRAIN-TRAP.

1,211,336.  Specification of Letters Patent.  Patented Jan. 2, 1917.

Application filed June 2, 1913. Serial No. 771,322.

*To all whom it may concern:*

Be it known that I, JOHN H. NICHOLS, a citizen of the United States, and resident of Spencer, in the county of Clay and State of Iowa, have invented a certain new and useful Drain-Trap, of which the following is a specification.

The object of my invention is to provide a drain trap of simple, durable and inexpensive construction, especially designed for use in connection with bath tubs and capable of being placed wholly above the floor on which the bath tub is resting.

More specifically it is my object to provide a drain trap of this class which is not likely to leak either gas or air and which cannot be siphoned when in use and which may be readily and easily opened up for clean-out purposes without danger of spilling the contents of the trap upon the floor.

A further object is to provide a trap of this kind, which may be readily, quickly and easily assembled or taken apart without the employment of soldered joints and in which the various connections to the sewer pipe, the overflow pipe and the bath tub drain pipe may all be made by the use of suitable union nuts which may be at any time removed or replaced without injury or damage to the trap or the fittings connected therewith.

My invention consists in certain details, in the construction, combination and arrangement of the various parts of the device, whereby the objects contemplated are attained, as hereinafter more fully set forth, pointed out in my claim and illustrated in the accompanying drawings, in which:

Figure 1 shows a sectional view of a bath tub resting upon a floor and a side elevation of my improved drain trap applied thereto and connected with the sewer pipe, as in practical use. Fig. 2 shows an enlarged detail, vertical, sectional view of a drain trap, embodying my invention, and Fig. 3 shows a sectional view on the line 3—3 of Fig. 2.

Referring to the accompanying drawings, I have used the reference numeral 10 to indicate a floor and 11 a bath tub of ordinary construction resting on the floor.

The reference numeral 12 indicates a sewer pipe.

My improved drain trap comprises a cylindrical body portion 13, open at its top and provided with an exterior screw thread at 14. The bottom 15 of the trap body is preferably made flat and on one side of the body portion is a hollow extension 16, to receive a drain pipe. This extension is provided with screw threads 17 to receive a union nut.

The outlet for the drain trap comprises a tubular extension 18 formed on the bottom of the trap body and open at both ends. Its upper end is flared outwardly at 19 and the outer surface of its upper end is screw threaded at 20 for purposes hereinafter made clear.

The top of the trap body is detachable and is indicated by the numeral 21 and is designed to rest on top of the trap body 13 and be detachably secured thereto by means of the union nut 22. In the center of the top 21 is an opening 23 designed to receive an overflow pipe 24, which overflow pipe may be connected to the top 21 by means of a union nut 25. The drain pipe extension 16 is connected with a drain pipe 26 from the bath tub by means of a union nut 27.

The means for connecting the overflow extension 18 with an outlet pipe 28 is as follows: The said outlet pipe 28 is preferably made of lead and has its upper end flared outwardly at 29 to fit against the part 19. The union nut 30 is provided with an opening 31 at its center and with the parts around the opening 31 inclined downwardly and inwardly at 32 to fit against the part 29. The extension 18 and the nut 30 are preferably made of hard metal such as brass and obviously when this nut is screwed down tightly against the lead pipe 28, a tight joint will be provided and this is especially true in view of the fact that there is only a very slight amount of water pressure ever applied to this joint, and even if the joint should leak gas to a slight extent, it would not be detrimental as will be hereinafter more fully shown.

The gas bell is indicated by the numeral 33 and is hemispherical in shape and of somewhat smaller diameter than the interior of the trap body 20. It is supported in position within the trap upon two posts 34 and 35, which posts are fixed to the nut 30 and extend straight upwardly from diametrically opposite edges from said nut, as clearly shown in Fig. 3. Screws 36 are extended through the gas bell and seated in the tops of said posts.

In assembling my improved drain trap, the lead outlet pipe is first extended up through a floor and then the drain trap may be set on this overflow pipe with the overflow pipe extending upwardly through the hollow extension 18. When in this position the upper end of the lead outlet pipe may be flared outwardly in the manner well known to plumbers. Then the nut 30 may be applied and screwed down tight. Then the bell 33 may be placed in position after which the drain pipe and the overflow pipe may be connected to the bell by the union nuts in the ordinary manner. It is obvious that this operation may be accomplished very quickly and easily and that it does not require any great amount of skill.

One of the advantages of my invention is that the entire trap may be located above the floor where it will be readily accessible. Another advantage is that the weight of the trap may rest upon the floor and is not necessarily borne by the pipes connected to it, thus relieving said pipes of strains.
I preferably place the drain pipe in such position that the upper end of the outlet pipe will be slightly below the bottom of the bath tub so that water flowing from the bath tub will pass upwardly into the bell 33 and then down through the outlet pipe. When however the flow of water has ceased the level of the water will stand at about the place where the joint is made at the top of the lead outlet pipe so that there will be practically no water pressure on this joint. The posts 34 and 35 are obviously so arranged that a bar or the like can be placed between them in engagement with both of them, and used as a wrench for screwing the nut on or off. Another advantage of my invention is that by having the overflow pipe leading to the top of the trap above the water level, all danger by siphoning the trap is avoided and yet no gas can escape through this overflow pipe.
I claim as my invention:

In a device of the class described, a tube having at one end on its outer surface an annular, laterally projecting, externally screw-threaded flange, the inner portion of said flange being beveled upwardly and outwardly, a second tube received within the first tube having an outwardly and upwardly flaring flange at its upper end resting upon the beveled portion of said first flange, and a nut having an annular portion resting above the upper edges of said flanges, and provided with a downwardly inclined, internally screw-threaded flange received on said first flange, said nut having a central, annular, inwardly and downwardly inclined flange adapted to engage the flaring portion of the second tube and press it against the beveled portion of said first flange, said nut having opposite upwardly extending members adapted to be engaged by a bar or the like for screwing the nut into position.

Des Moines, Iowa, May 28, 1913.

JOHN H. NICHOLS.

Witnesses:
G. A. HEALD,
W. G. CRANDALL.

Copies of this patent may be obtained for five cents each, by addressing the "Commissioner of Patents, Washington, D. C."